(12) United States Patent
Blakeslee et al.

(10) Patent No.: US 7,814,736 B2
(45) Date of Patent: Oct. 19, 2010

(54) ONE PIECE TALL FEED DRUM

(75) Inventors: Edward A. Blakeslee, Ephrata, PA (US); Donald R. Whitenight, Ephrata, PA (US); Wayne D. Thaxton, Denver, PA (US)

(73) Assignee: CNH America LLC, New Holland, PA (US)

( * ) Notice: Subject to any disclaimer, the term of this patent is extended or adjusted under 35 U.S.C. 154(b) by 407 days.

(21) Appl. No.: 12/041,284

(22) Filed: Mar. 3, 2008

(65) Prior Publication Data

US 2009/0217638 A1   Sep. 3, 2009

(51) Int. Cl.
   *A01D 61/00*   (2006.01)
(52) U.S. Cl. ...................................... 56/16.6; 56/DIG. 5
(58) Field of Classification Search .................. 56/6,
   56/13.5, 13.6, 13.9, 14.5, 16.4 A, 16.4 B,
   56/16.4 R, 16.6, 157, 192, 255, 295, DIG. 5,
   56/DIG. 20
   See application file for complete search history.

(56) References Cited

U.S. PATENT DOCUMENTS

| | | | | |
|---|---|---|---|---|
| 2,005,633 | A * | 6/1935 | Peck | 172/36 |
| 3,125,844 | A | 3/1964 | Beyer | |
| 3,389,539 | A * | 6/1968 | Zweegers | 56/6 |
| 3,443,369 | A * | 5/1969 | Zweegers | 56/6 |
| 3,654,751 | A | 4/1972 | Meharry | |
| 3,676,988 | A | 7/1972 | Hauser-Lienhard | |
| 3,775,952 | A | 12/1973 | Aiuppa | |
| 4,428,185 | A | 1/1984 | Toillie et al. | |
| 4,653,253 | A * | 3/1987 | Voler et al. | 56/13.6 |
| 4,787,196 | A * | 11/1988 | Voler et al. | 56/13.6 |
| 4,809,488 | A * | 3/1989 | Neuerburg et al. | 56/13.6 |
| 4,860,527 | A | 8/1989 | Maarten | |
| 4,951,450 | A * | 8/1990 | Koorn et al. | 56/13.6 |
| 5,031,391 | A * | 7/1991 | Meijering | 56/13.6 |
| 5,345,752 | A * | 9/1994 | Pruitt et al. | 56/6 |
| 5,768,865 | A | 6/1998 | Rosenbalm et al. | |
| 6,082,085 | A * | 7/2000 | Stelzer et al. | 56/14.9 |
| 6,158,201 | A | 12/2000 | Pruitt et al. | |
| 6,497,087 | B1 | 12/2002 | Stiefvater et al. | |
| 6,840,027 | B2 | 1/2005 | Donselaar | |
| 7,356,982 | B2 * | 4/2008 | Barnett | 56/153 |
| 7,461,498 | B1 * | 12/2008 | Barnett | 56/192 |

* cited by examiner

*Primary Examiner*—Thomas B Will
*Assistant Examiner*—Joan D Misa
(74) *Attorney, Agent, or Firm*—Patrick M. Sheldrake; Michael G. Harms

(57) ABSTRACT

An improved crop conveying drum for a drive disc cutter mounted directly to the drive shaft mechanism providing rotational power to the cutterbar. The crop conveying drum includes a pair of mating segments, each forming a half of the drum. Each segment is formed from a single piece of plate material and stamped into the desired curvilinear configuration. A central mounting portion of each segment is contoured to match the drive shaft mechanism and allow connection thereto. Holes in the central mounting portion allow insertion fasteners to connect the drum segments directly to the drive shaft mechanism so that the crop conveying drum rotates in unison with the drive shaft. By forming the drum segments from a single plate of material, material characteristics can be more easily selected or more quickly modified compared to the fabricated weldments known in the art.

20 Claims, 4 Drawing Sheets

ONE PIECE TALL FEED DRUM

BACKGROUND OF THE INVENTION

This invention relates generally to a machine for harvesting crops in a field and, more particularly, to a disc cutterbar having an operating width greater than the width of the crop harvesting mechanism operating rearwardly of the disc cutterbar.

In modern crop harvesting machines, such as those having rotary disc cutterbars, the desire is to increase the width of cut of the machines to reduce the length of time the machine is operated in the field. Crop harvesting machines, such as those used to harvest hay and forage crops, typically have a conditioning mechanism mounted rearwardly of the crop cutting mechanism to crack the stems of the crop and enhance drying, as is well known in the art. The width of the conditioning rolls is limited due to manufacturing constraints, operating tolerances and financial considerations. Accordingly, increasing the operating width of the cutting mechanism may not result in an equivalent increase in the width of the conditioning rolls.

Having the conditioning rolls with a transverse width less than the transverse cutting width of the disc cutterbar requires that the severed crop be conveyed laterally and inwardly in the header for a distance before being fed rearwardly into the conditioning rolls. A number of devices have been created to effect the conveyance of this severed crop. In one known configuration, a drive shaft mechanism extends downwardly from the superstructure of the header to attach to one of the disc cutters and provide driving power to the cutterbar, similar to that shown in U.S. Pat. No. 5,179,822, issued on Jan. 19, 1993, to McLean, et al. The positioning of this drive shaft mechanism within the normal path of crop movement further complicates the conveyance of severed crop toward the center of the header. The rapidly rotating drive shaft is subject to being unbalanced from an accumulation of severed crop in the shaft mechanism, especially in the universal joints required to permit a flexible movement of the cutterbar relative to the header superstructure. Mounting a crop conveying drum of the type known on the disc cutter does not present a viable solution to shielding the drive shaft mechanism as a large amount of internal clearance would be necessary to permit deflection of the drive shaft. Large clearances between the drive shaft and the drum allow entry of severed crop material and entanglement with the drive shaft mechanism.

In another configuration shown in U.S. Pat. No. 6,497,087, issued on Dec. 24, 2002 to Stiefvater et al., a crop conveying drum for a drive disc cutter mounted directly to the drive shaft mechanism to provide rotational power to the cutterbar, also known as a "tall drum," is shown. The crop conveying drum assists in conveying severed crop material laterally from outlying disc cutters toward a central opening for the conditioning rolls. The crop conveying drum serves as a barrier to prevent severed crop from wrapping around and accumulating on the drive shaft mechanism but features an open configuration which minimizes the accumulation of debris between the drum and the drive shaft mechanism. The crop conveying drum is formed as a pair of mating segments, each forming a half of the drum, and features. Each segment has a pair of support bars vertically oriented and extending between generally opposing connecting flanges. A mounting bracket centrally and supported by the vertical support bars is formed to partially wrap around the drive shaft mechanism and allow connection thereto. The mounting bracket has holes therein for the passage of fasteners to connect the drum segment directly to the drive shaft mechanism so that the crop conveying drum rotates with the drive shaft mechanism. Upper and lower mating connecting flanges are fastened together to form the entire crop conveying drum rotatable with the drive shaft. A completed welded drum requires two weldments and six hardware joints. The welded design has proven to be difficult to maintain assembly tolerances and costly to manufacture.

Accordingly, it would be desirable to provide a device that would protect the drive shaft mechanism from being overloaded with severed crop material and assist in the inward conveyance of severed crop for feeding into the conditioning mechanism around the barrier presented by the drive shaft mechanism that feature a simplified design and installation to overcome the above problems and limitations.

SUMMARY OF THE INVENTION

Accordingly, it is an object of the present invention to provide a crop conveying drum to protect the drive shaft mechanism from being overloaded with crop material and assist inward conveyance of crop material into the conditioning mechanism formed from components that are easy to fabricate and assemble into position.

It is a further object of the present invention to overcome the disadvantages of the prior art by providing a crop conveying drum mounted to the drive shaft mechanism in a header, wherein the drive shaft mechanism is located in the path of severed crop movement within the header.

It is a further object of the present invention that the rotating drum assists in conveying severed crop material inwardly toward a central location in a header for feeding to a conditioning mechanism.

It is a further object of the present invention that the crop conveying drum be mounted directly to the drive shaft mechanism to be rotatable therewith.

It is a further object of the present invention that the crop conveying drum can be formed with a smaller diameter than would be possible with the drum mounted directly to the disc cutter.

It is a still further object of the present invention that any crop accumulation within the conveying drum does not cause interference with the operation of the drive shaft mechanism.

It is a still further object of the present invention that the conveying drum rotate with the drive shaft mechanism so that there is no relative rotational movement therebetween and that there is no horizontal movement of the crop conveying drum relative to the drive shaft mechanism.

It is a still further object of the present invention to provide a crop conveying drum having sufficient length to protect the drive shaft mechanism and prevent the accumulation of severed crop material on the drive shaft mechanism.

It is a still further object of the present invention to provide a crop conveying drum that is operable to shed crop material and other debris accumulated therein.

It is yet another object of the present invention that the conveying drum is formed of two identical halves that are clamped to the drive shaft mechanism.

It is yet another object of the present invention that each of the two halves of the conveying drum be formed from a single plate of material stamped into a desired configuration.

It is yet another object of the present invention to provide a crop conveying drum having an optimally compact construction.

It is yet another object of the present invention to provide an open drum construction to provide a passage for severed crop material to pass through without accumulating in the drum.

It is yet another object of the present invention that the severed crop material will not be permitted to accumulate within the drum to cause unbalance in the drive line.

It is a still further object of the present invention that the drum have an outer periphery configuration that provides aggressiveness in conveying severed crop material inwardly and rearwardly around the drum.

It is a still further object of the present invention to provide a crop conveying drum protecting the drive shaft mechanism that is durable in construction, inexpensive of manufacture, carefree of maintenance, easily assembled, and simple and effective to use.

These and other objects are achieved according to the instant invention by providing an improved crop conveying drum for a drive disc cutter mounted directly to the drive shaft mechanism providing rotational power to the cutterbar. The crop conveying drum includes a pair of mating segments, each forming a half of the drum. Each segment is formed from a single piece of plate material and stamped into the desired curvilinear configuration. A central mounting portion of each segment is contoured to match the drive shaft mechanism and allow connection thereto. Holes in the central mounting portion allow insertion of fasteners to connect the drum segments directly to the drive shaft mechanism so that the crop conveying drum rotates in unison with the drive shaft. By forming the drum segments from a single plate of material, material characteristics can be more easily selected or more quickly modified compared to the fabricated weldments known in the art.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right," "up" or "down," or "top" or "bottom" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
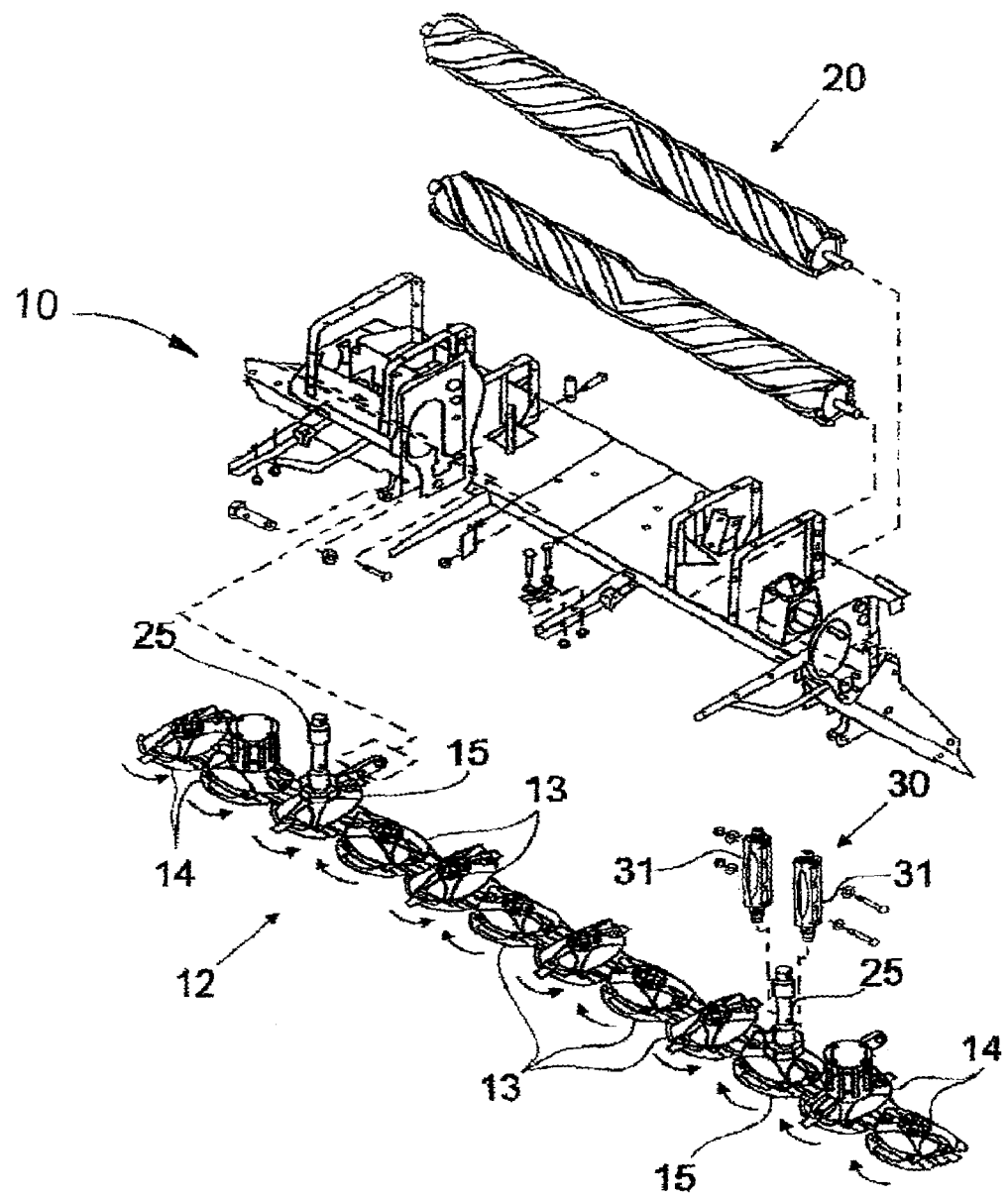
FIG. 1 is a partial perspective view of a typical cutter head for a harvesting machine of the type on which the present invention is useful.

Referring first to FIG. 1, a portion of crop harvesting machine header 10 such as is commonly employed on a windrower, mower-conditioner, or other crop harvester customarily used to a standing crop such as hay, can best be seen. This configuration of the crop harvesting machine header 10 includes a disc cutterbar 12 operable to sever standing crop material with a rotary impact action, as is well known in the art. The disc cutterbar 12 includes a plurality of disc cutters 13-15 arranged in a transversely spaced configuration to define the cutting width of the disc cutterbar 12. The cutterbar 12 includes interior disc cutters 13, outlying disc cutters 14 and drive cutters 15 positioned between the interior disc cutters 13 and the outlying disc cutters 14. Adjacent interior disc cutters 13 are rotated in opposite directions so as to be effective to cut the standing crop material and then convey the severed crop material between the disc cutters 13 that converge in the paths of rotation.

The general operation and construction of a disc cutterbar 12 can be found in U.S. Pat. No. 5,996,323, issued on Dec. 7, 1999, to Campbell, et al, the descriptive portions of which are incorporated herein by reference. The outlying disc cutters 14 depart from the teachings of the aforementioned Campbell patent because the outlying disc cutters 14 co-rotate toward the interior disc cutters 13. The drive disc cutters 15 rotate in the same direction as the outlying disc cutters 14 to cut standing crop material and convey the severed crop material inwardly toward the interior disc cutters 13 so that the crop can be conveyed inwardly and rearwardly.

The crop harvesting machine may also include a crop conditioning mechanism supported immediately rearwardly of the header 10. One skilled in the art will recognize that some embodiments of crop harvesting machines are not provided with a conditioning mechanism, in which case the crop would be deposited on the ground. The preferred embodiment of the conditioning mechanism is a pair of counter-rotating, intermeshing conditioning rolls 20, which are well known in the art; however, other forms of conditioning devices, such as flail conditioners, could also be provided. The transverse length of the conditioning rolls 20 is effectively limited by the construction and operation of the rolls.

Because of the practicalities limiting the transverse length of the conditioning rolls, the greater operating widths of the disc cutterbars 12 require that only the interior disc cutters 13 be operable to convey severed crop material directly into the centrally positioned, rapidly rotating conditioning mechanism. The outlying disc cutters 14 must be operable to convey the severed crop material inwardly toward the interior disc cutters 13, since there is no operating portion of the conditioning mechanism located immediately rearwardly of the outlying disc cutters 14. At least one of the outlying disc cutters is a drive disc cutter 15 as it receives motive power for the cutterbar from drive shaft mechanism 25. In the preferred embodiment, drive shaft mechanism is provided with a conveying drum 30 mounted directly thereto to be rotatable therewith. The crop conveying drum serves to urge severed crop material inwardly with the corresponding rotation of the drive shaft and also to form a protective barrier around the drive shaft mechanism to prevent severed crop material from becoming entangled in the drive shaft mechanism. The drive disc cutters 15 are positioned to be partially in front of the conditioning mechanism; however, the proper rotation of the drive disc cutters 15 will move the crop material severed thereby into the operating width of the conditioning mechanism. Operation and construction of a conveying drum is disclosed in U.S. Pat. No. 6,497,087, issued on Dec. 24, 2002, to Stiefvater, et al, which is incorporated by reference herein in its entirety.

The drive disc cutters 15 have a drive shaft mechanism 25 extending downwardly from the overhead superstructure 11 directly into the center of the drive disc cutter 15 to engage the drive train (not shown) within the cutterbar 12 to effect rotational operation thereof in a conventional manner. The general construction and operation of an inboard drive shaft mechanism 25 can be found in U.S. Pat. No. 5,179,822, issued to McLean on Jan. 19, 1993, the descriptive portions thereof being incorporated herein by reference. In larger disc cutterbars 12, e.g., disc cutterbars having an operating cutting width significantly greater than the transverse operating width of the conditioning mechanism, additional disc cutters 14 will be positioned outboard of the drive disc cutters 15. With the drive shaft mechanism 25 positioned interiorly of the outlying disc cutters 14, the severed crop must move inwardly past the drive shaft mechanism 25 before turning the corner to move rearwardly into the conditioning mechanism. Accordingly, it would be desirable to place a device over the drive shaft mechanism 25 to help move severed crop material around the corner defined by the downwardly extending shaft and to prevent entanglement of the severed crop material in the drive shaft mechanism.

One skilled in the art will recognize that other type of crop severing apparatus would be subject to similar crop movement issues involving a cutting width that substantially exceeds the conditioning mechanism inlet width. The present invention may also provide utility in such alternate cutterbars in which motive power for the cutterbar is provided by a similarly configured drive shaft mechanism positioned along the path of crop movement.

Figure 2:
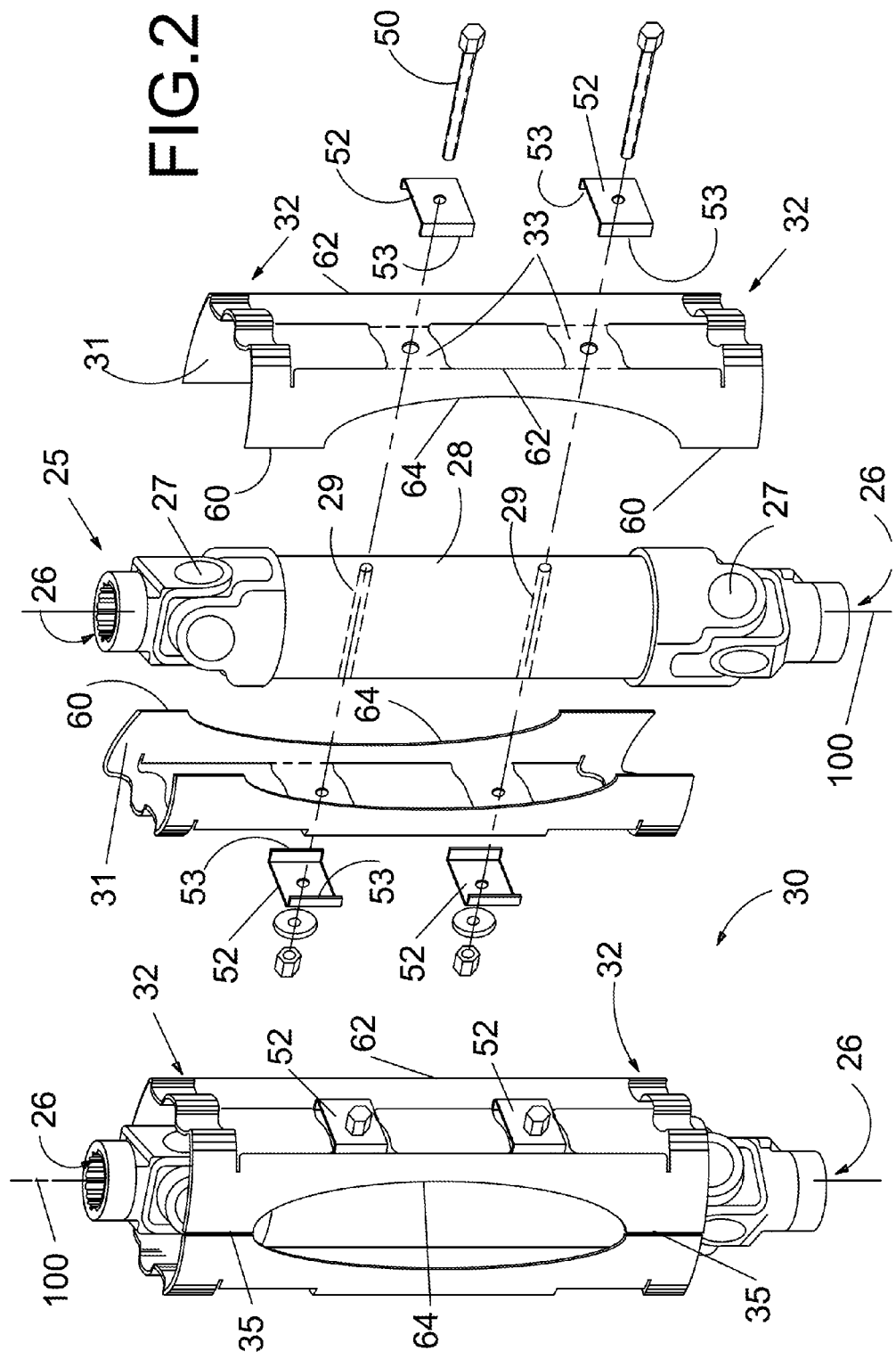
FIG. 2 is a partial perspective view of a drive shaft mechanism showing assembled and exploded presentations of the improved tall feed drum and its connection to the drive shaft mechanism.

The crop conveying drum 30 is best seen in FIGS. 2-6, while the drive shaft mechanism 25 is best depicted in FIG. 2. The drive shaft mechanism 25 includes upper and lower connecting devices 26, a pair of opposing universal joints 27, and a central shaft 28 with an axis of rotation 100. The drive shaft mechanism 25 permits a slight expansion of the distance between the upper frame superstructure and the cutterbar 12 so that the drive shaft mechanism 25 flexes with the movement of the disc cutterbar 12. The drive shaft mechanism 25 includes a pair of mounting holes 29 formed in the central shaft 28 for the mounting of the crop conveying drum 30, as will be described in greater detail below. The crop conveying drum 30 is preferably formed in a two-piece configuration in opposing, generally identical segments 31, each forming approximately half of the drum 30. When installed, the two segments 31 have a central axis 110 aligned with the central shaft axis of rotation 100. When removed, the central axis 110 of each segment defines a longitudinal line of symmetry for the segment.

Each elongate segment 31 comprises a single formed part requiring no welding or assembly of components. Each segment 31 has generally opposing first and second end portions 32 with a curvilinear cross-sectional profile defining a plurality of rolled rib-like structures 36 aligned generally parallel to the central axis 110. The rib-like structures 36 urge severed crop material toward a desired location while the crop conveying drum is rotating. Each segment 31 also includes at least one, but preferably a pair of mounting structures 33 for connecting the segment 31 to the mounting holes 29 in the central shaft 28 for rotation therewith. Connection to the central shaft may be by conventional fasteners 50 extending through both segments 31 of the drum 30 and the mounting holes 29 in the shaft. Adapters 52 provided a generally flat surface adjacent to the fasteners 50 and have load edges 53 which distribute the clamping load across a larger area of the mounting structure 33 and preclude deformation of segment 31 due to the applied clamping force. Side edges 60 extend between the opposing end portions 32 and define the interface boundary with the opposing segment 31 when two segments are combined into the drum 30. Side edges 60 are in direct contact when opposing segments 31 are in an operating configuration of a drive shaft mechanism, held in position by a slight preload between the opposing segments 31. This slight preload is necessary to maintain the side edges 60 of the opposing segments 31 properly aligned and prevent sharp edges at the segment interface which could catch and collect crop material during harvester operation.

Figure 5:
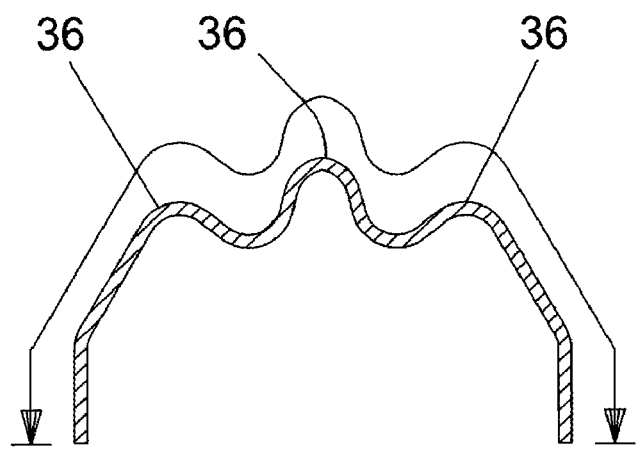
FIG. 5 is a section view of the segment shown in FIG. 3 taken along line 5-5.
Figure 6:
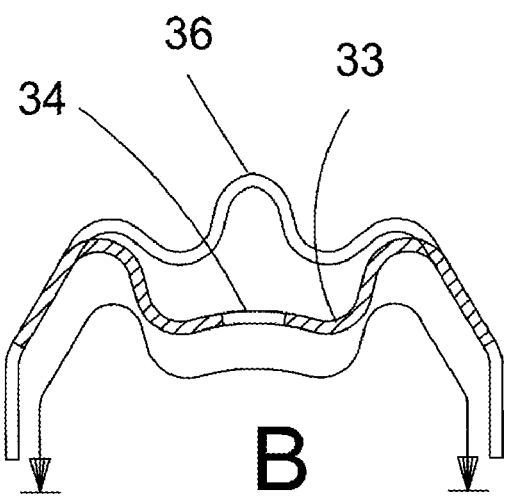
FIG. 6 is a section view of the segment shown in FIG. 3 taken along line 6-6.

Each segment 31 is formed from a single, generally planar blank of material featuring a plurality of openings therethrough to allow separate contours for the ribs 36 in end portions 32 and centrally disposed mounting structure(s) 33 to be stamped. Stamping recontours the plate so that it is no longer a flat plate of material stock, but the curved item shown in FIGS. 2-6. The contours of the end portions 32 and mounting structures 33 are such that each has approximately the same transverse material length (shown as lengths "A" and "B" in FIGS. 5 and 6, respectively) to prevent tearing of the material during the stamping operation. As illustrated in FIGS. 5 and 6, the contour length of the ribs 36 ("A" in FIG. 5), viewed in cross-section, is substantially the same as the contour length of the mounting structure 33, also viewed in cross-section ("B" in FIG. 6).

Figure 3A:
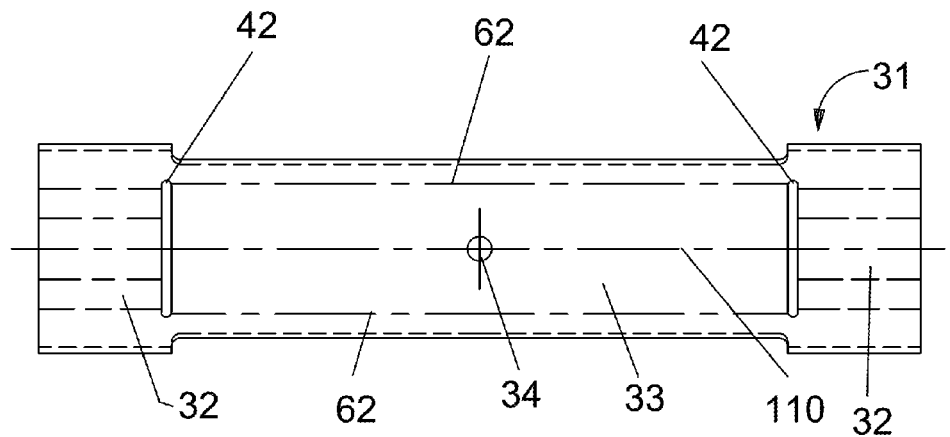
FIG. 3A is a plan view of one segment of one embodiment of the improved tall drum of the present invention.
Figure 3B:
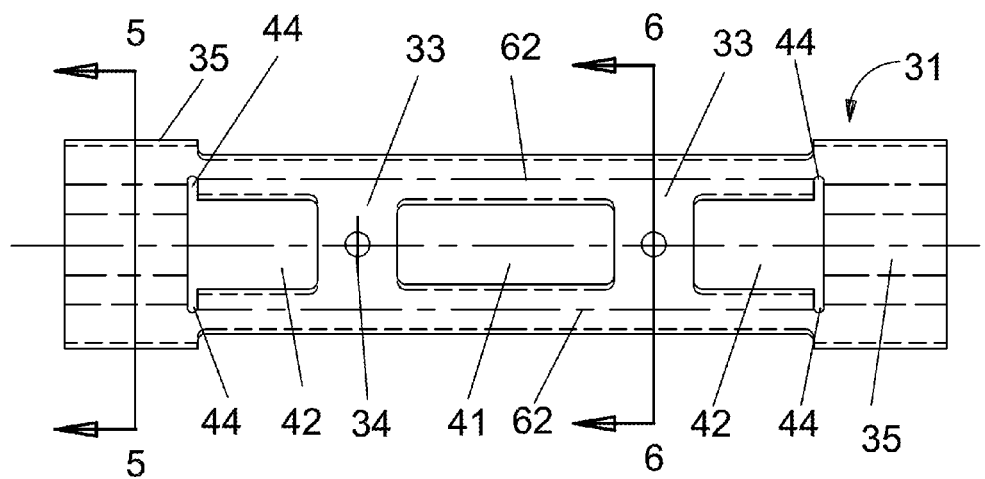
FIG. 3B is a plan view of one segment of a preferred embodiment of the improved tall drum of the present invention.
Figure 4:
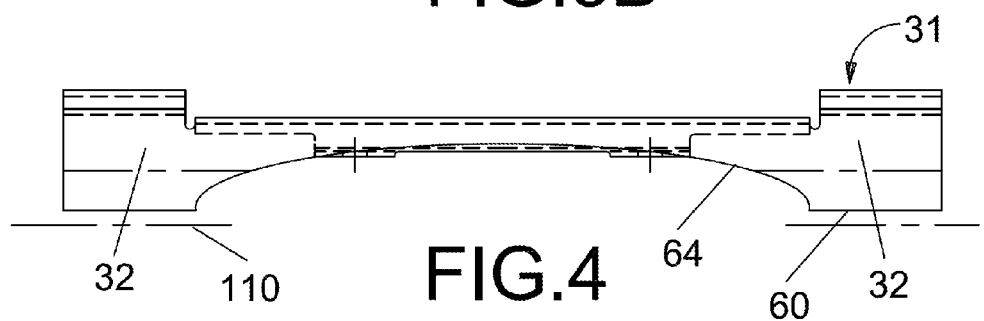
FIG. 4 is an elevation view of one segment of the improved tall drum of the present invention.

Mounting structures 33 and end portions 32 are separated by a pair of openings 42, one adjacent each end portion 32. At a minimum, opening 42 must be sufficient sized to allow end portion 32 and mounting structure 33 to be stamped into differing curvilinear contours without overstressing the plate material and causing tears or bunching. This is illustrated in FIG. 3A wherein the openings 42 are minimally sized. Using minimally sized openings 42 can lead to build-up of debris on the segments. As a result, openings 42 are generally enlarged as shown in FIG. 3B. Larger openings 42 are preferred as they reduce the tendency of the drum segments to collect debris, provide access to portions of the drive shaft mechanism (e.g., grease fittings), and reduce the material required for and weight of the drum assembly. To further reduce stresses and resist the potential for material tearing during the stamping operation, relief structures 44 may be incorporated in the openings 42. Additional material and/or weight savings is provided through the incorporation of an additional central cutout 41 which divides mounting structure 33 into two similar mounting structures, each with the possibility of having a mounting hole 34. Additional apertures may be provided in the segment 31 as necessary to enable access to the annular space between the drum 20 and the drive shaft mechanism 25.

The segments 31 are preferably open in construction to prevent collection of crop material in the crop conveying drum 30 and to provide moving edge structures to engage the crop material and urge it in the desired direction. The rib structures 36 formed into each end portion 32 provide an aggressive structure to engage the severed crop material and urge movement thereof in the direction the crop conveying drum 30 is rotating. Further crop engagement is provided by the transition edges 62 formed in the central portion of the segment adjacent to mounting structure 33. Still additional crop engagement is provided by reliefs 64 formed into side edges 60. Reliefs 64, when two segments 31 are joined into an operable drum 30, provide additional rotating edge structures for crop engagement and movement while enhancing the open characteristic of the drum 30 thereby enhancing clearing of crop and debris from the drum.

Segments 31 may be formed from a variety of material types and thicknesses. As the feed drum 30 is no longer fabricated from numerous individual components, changing the material from which the segments are formed is simplified to provide greater manufacturing flexibility. Selection of a stronger material allows thickness to be reduced thereby reducing rotating weight on the drive shaft mechanism. Selection of a heat treated material enhances the wear life and durability of the feed drum without issues related to welding heat treated parts in the earlier known fabricated drum. Combinations of these material variables allows the feed drum design to be optimized, perhaps for a variety of crops and/or machines, by beginning with a different material blank for the stamping. Such flexibility is not feasible with the earlier known fabricated feed drum assembly.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

What is claimed is:

1. A crop conveying drum for a shaft-driven cutterbar on a crop harvester comprising:
   first and second generally identical elongate drum segments for connection to a shaft for rotation therewith, each said segment is formed from a single piece of plate material, each said segment further comprising:
      a central axis;
      generally opposing first and second end portions, each end portion having a first curvilinear cross-sectional profile defining a first length measured along the entire said first cross-sectional profile, each said first cross-sectional profile extending in a direction generally parallel to said central axis for a distance;
      first and second openings through the segment, each opening being disposed adjacent to a respective end portion; and
      a central mounting section disposed between said first and second openings, said central section having at least one aperture for receiving a connector apparatus to connect said segment to the shaft, and a second curvilinear cross-sectional profile defining a second length measured along the entire said second cross-sectional profile, said first and second lengths being substantially equal, whereby stresses in said segment are minimized.

2. The crop conveying drum of claim 1, wherein said shaft has an outside contour and said second curvilinear cross-sectional profile is shaped to match said outside contour of the shaft.

3. The crop conveying drum of claim 2, wherein said central section includes a cutout dividing said central mounting section into first and second mounting sections, each mounting section having at least one aperture for receiving a connector apparatus to connect said segment to the shaft.

4. The crop conveying drum of claim 3, wherein the plate has a pair of generally opposing side edges, a pair of generally opposing side edges.

5. The crop conveying drum of claim 4, wherein each side edge extends between said first and second end portions and, when said drum is in an operable configuration, are located adjacent respective side edges of the opposing drum segment.

6. The crop conveying drum of claim 5, wherein said side edges of each segment include a cutout which interact with a cutout on the opposing segment of the conveying drum to urge crop material through rotation of the drum.

7. A crop conveying drum for a crop harvesting cutterbar, the cutterbar having a drive shaft mechanism for providing motive power to the cutterbar, the drive shaft mechanism including a central shaft with a rotational axis, the crop conveying drum for urging severed crop toward a central location on the cutterbar and comprising:
   first and second generally identical elongate drum segments for connection to the central shaft for rotation therewith, each said segment is formed from a single piece of plate material each said drum segment further comprising:
      a central axis;
      generally opposing first and second end portions, each end portion having a first curvilinear cross-sectional profile defining a first length measured along the entire said first cross-sectional profile, each said first cross-sectional profile extending in a direction generally parallel to said central axis for a distance;
      first and second openings through the segment, each opening being disposed adjacent to a respective end portion; and
      a central section disposed between said first and second openings, said central section having at least one aperture for receiving a connector apparatus to connect said segment to the shaft, and a second curvilinear cross-sectional profile defining a second length measured along the entire said second cross-sectional profile, said first and second lengths being substantially equal whereby stresses in said segment are minimized.

8. The crop conveying drum of claim 7, wherein said shaft has an outside contour and said second curvilinear cross-sectional profile is shaped to match said outside contour of the shaft.

9. The crop conveying drum of claim 8, wherein said central section includes a cutout dividing said central section into first and second mounting sections, each mounting structure having at least one aperture for receiving a connector apparatus to connect said segment to the shaft.

10. The crop conveying drum of claim 9, wherein the plate has a pair of generally opposing side edges a pair of generally opposing side edges.

11. The crop conveying drum of claim 10, wherein each side edge extends between said first and second end portions and is located adjacent respective side edges of the opposing drum segment when said drum is in an operable configuration.

12. The crop conveying drum of claim 11, wherein said side edges of each segment include a cutout which interact with a cutout on the opposing segment of the conveying drum to urge crop material through rotation of the drum.

13. The crop conveying drum of claim 12, wherein said central axis of each said drum segment is aligned with the rotational axis when said drum is in an operable configuration.

14. In a crop harvesting machine having a frame, a disc cutterbar supported on said frame to sever standing crop material and discharge the severed crop material toward a central discharge, the disc cutterbar including a plurality of disc cutters, at least one of the plurality of disc cutters being a drive disc cutter; a drive mechanism connected to the drive disc cutter, the drive mechanism including a central shaft having a rotational axis and connected to said at least one drive disc cutter to direct drive power to said disc cutterbar for operation of all of said disc cutters, and a crop conveying drum mounted on the central shaft for rotation therewith, rotation of the conveying drum for urging severed crop material toward the central discharge, the improvement comprising:

first and second generally identical elongate drum segments, each said segment is formed from a single piece of plate material, each said drum segment further comprising:

a central axis;

generally opposing first and second end portions, each end portion having a first curvilinear cross-sectional profile defining a first length measured along the entire said first cross-sectional profile, each said first cross-sectional profile extending in a direction generally parallel to said central axis for a distance;

first and second openings through the segment, each opening being disposed adjacent to a respective end portion; and a central section disposed between said first and second openings, said central section having at least one aperture for receiving a connector apparatus to connect said segment to the shaft, and a second curvilinear cross-sectional profile defining a second length measured along the entire said second cross-sectional profile, said first and second lengths being substantially equal whereby stresses in said segment are at minimized.

15. The improvement of claim 14, wherein said shaft has an outside contour and said second curvilinear cross-sectional profile is shaped to match said outside contour of the shaft.

16. The improvement of claim 15, wherein said central section includes a cutout dividing said central section into first and second mounting sections, each mounting section having at least one aperture for receiving a connector apparatus to connect said segment to the shaft.

17. The improvement of claim 16, wherein the plate has a pair of generally opposing side edges a pair of generally opposing side edges.

18. The improvement of claim 17, wherein each side edge extends between said first and second end portions and is located adjacent respective side edges of the opposing drum segment when said drum is in an operable configuration.

19. The improvement of claim 18, wherein said side edges of each segment include a cutout which interact with a cutout on the opposing segment of the conveying drum to urge crop material through rotation of the drum.

20. The improvement of claim 19, wherein said central axis of each said drum segment is aligned with the rotational axis when said drum is in an operable configuration.

* * * * *